United States Patent [19]

Shen

[11] Patent Number: 5,764,758

[45] Date of Patent: Jun. 9, 1998

[54] INTERRUPTED TONE CONVERTER

[75] Inventor: Anthony P. Shen, Unionville, Canada

[73] Assignee: Aastra Aerospace Inc., North York, Canada

[21] Appl. No.: 641,844

[22] Filed: May 2, 1996

[51] Int. Cl.[6] ............................................. H04M 1/00

[52] U.S. Cl. ........................ 379/372; 379/377; 379/376; 379/373

[58] Field of Search ............................ 379/372, 386, 379/377, 396, 89, 376, 373, 52, 142, 98

[56] References Cited

U.S. PATENT DOCUMENTS

| | | |
|---|---|---|
| 4,985,914 | 1/1991 | Fukunaga . |
| 5,023,906 | 6/1991 | Novas . |
| 5,070,526 | 12/1991 | Richmond et al. . |
| 5,228,076 | 7/1993 | Hopner et al. . |
| 5,287,401 | 2/1994 | Lin ................................................ 379/98 |
| 5,327,493 | 7/1994 | Richmond et al. . |
| 5,619,561 | 4/1997 | Reese ........................................... 379/142 |

Primary Examiner—Dwayne D. Bost
Assistant Examiner—Keith Ferguson
Attorney, Agent, or Firm—Kilpatrick Stockton LLP

[57] ABSTRACT

A technique for converting specific dial tone signals received from a telephone exchange, such as those which indicate a Message Waiting, into formats that are readily recognized by telephones or adjunct devices is disclosed. A dial tone converter device is connected between the telephone exchange providing the dial tone signalling and a message indicator device (such as an integrated telephone or message display adjunct device) which does not recognize dial tone signals. Alternately, the dial tone converter device is connected in parallel with the message indicator device. Under normal conditions, the message indicator device is connected to the telephone exchange in a way that all types of signalling (including dialing, voice, and FSK) can pass to and from the exchange. At specific intervals when neither the telephone nor any extensions at the subscriber's number are in use, the dial tone converter engages the line such that the dial tone signal is provided by the telephone exchange. The converter device briefly monitors the dial tone signal, determines whether the dial tone signal conforms to a specific dial tone signal (such as interrupted or continuous tones), then disengages the line. The converter device then transmits the related information to the message indicator device in a format which will be recognized thereby.

18 Claims, 8 Drawing Sheets

INTERRUPTED TONE CONVERTER

FIELD OF THE INVENTION

This invention relates to a method and apparatus for converting specific dial tone signals received from a telephone exchange, such as those which indicate a Message Waiting, into formats that are readily recognized by message indicator devices.

BACKGROUND OF THE INVENTION

Call answering services are provided by telephone companies in many areas. These services provide a function much like an answering machine whereby messages can be taken from callers if the call is not answered by the subscriber, or in some cases, if the subscriber is already on the telephone at the time the call is placed. Once a message is taken, the telephone company will let the subscriber know a message is waiting.

A first method of alerting a subscriber of a message is to alter the sound of the dial tone so that if the subscriber were to take his telephone off-hook and listen to the dial tone, the subscriber would hear an intermittent dial tone (referred to as an interrupted dial tone or a "stuttertone"). If no message were waiting, the dial tone would be a continuous tone (as usual in most places). In some areas, this is the only means by which the telephone company can alert subscribers to the presence of messages.

An alternative method of alerting users of a message is to transmit a signal in a frequency shift keyed (FSK) format or a similar format which can be detected and decoded electronically by devices specially configured to convey the information contained in the signal to a user. These message indicator devices are typically enhanced telephones, Caller ID units, or dedicated Message Waiting Indicators. Such devices typically activate a flashing light or a text message upon receiving a signal from the telephone company which indicates that a message is waiting. Thus, these devices alert a subscriber to messages without the subscriber having to remember to engage the telephone and listen to the dial tone.

The conventional interrupted dial tone method suffers from an obvious drawback that a subscriber must remember to take the telephone off-hook and listen to the dial tone periodically to be made aware of waiting messages. Moreover, where only an interrupted dial tone indication is used, the use of FSK signals for indicating the presence of a waiting message is unavailable. This is because most conventional devices capable of visually (or otherwise) indicating that a message is waiting will only recognize FSK-type signals, and thus will not identify different types of dial tones.

U.S. Pat. No. 5,327,493 describes a technique for addressing the inconvenience inherent to message alerting based on an interrupted dial tone. A device utilizing this technique periodically takes a telephone line off-hook and determines whether an interrupted dial tone is present on the line. If an interrupted dial tone is present, an indication is made to the user, for example, with an indicator light circuit. While allowing a customer to be alerted to a waiting message without having to listen for an interrupted dial tone, the U.S. Pat. No. 5,327,493 does not disclose a technique by which conventional alerting devices which rely on FSK signalling can be used in an environment that utilizes interrupted dial tone signalling.

SUMMARY OF THE INVENTION

It is an object of the invention to overcome these limitations and others. More particularly, it is an object of the present invention to provide an add-on device that solicits a dial tone from the telephone exchange, detects and identifies specific dial tones, and converts them to a different signal format which is compatible with an existing device which conveys the message to a user.

The invention is based on a technique by which a message received from a central office in a first format is converted to a second format that can be understood by a conventional device utilized to decode the message and convey the information contained therein to a subscriber. With this technique, the subscriber line is monitored to determine the occurrence of one or more predetermined conditions. Upon detection of these predetermined conditions, the subscriber line is placed in an off-hook condition to detect the message in the first format. The message is then converted from the first format to a converted message in the second format. The converted message is subsequently provided to a message indicator device where the message is conveyed to the user, visually or in some other manner.

According to one aspect of the invention, the predetermined conditions include an unanswered call or a completion of a call.

According to another aspect of the invention, the first format is an interrupted dial tone and the second format is a frequency shift keyed format.

According to another aspect of the invention, the converter is connected in parallel with one or more message indicator devices. Alternately, the converter is connected in series between the subscriber line and at least one such message indicator devices.

According to yet another aspect of the invention, the message indicator device is "awakened" with a ring signal prior to receiving the converted message.

According to another aspect of the invention, the message is a signal which indicates that a voice message is available for retrieval by the subscriber.

According to still another aspect of the invention, the subscriber line is placed in an off-hook condition to detect the message in the first format at specific intervals when the subscriber line is not in use by any message indicator devices or telephone devices connected thereto.

Other aspects and advantages of the invention will be made apparent by the detailed examples of the invention set forth below.

DETAILED DESCRIPTION OF THE PREFERRED EMBODIMENTS

Figure 1:
FIG. 1 is a block diagram showing a first embodiment of the invention as connected to a central exchange and to a message indicator device.

FIG. 1 is a block diagram showing a configuration of a dial tone converter 2 according to a first embodiment of the invention. The dial tone converter 2 is connected in series via a standard telephone wire 8 (e.g., a twisted pair) to a message indicator device 10. The message indicator device 10 may comprise any device, such as an enhanced telephone, a caller ID unit or a dedicated message waiting indicator, which is capable of decoding a message received in a particular format (such as an FSK format), and of conveying the message to a user. As noted above, this is typically accomplished with a visual indicator such as a flashing light. However, other possible indications are possible.

The dial tone converter 2 connects the message indicator device 10 to a central office 4 (for example, a public exchange operated by a telephone company or a private branch exchange) via a twisted pair 6. In this embodiment, the dial tone converter 2 identifies particular dial tone characteristics received from the central office 4 and conveys the information corresponding to those characteristics to the message indicator device 10 in a different signalling format.

Figure 2:
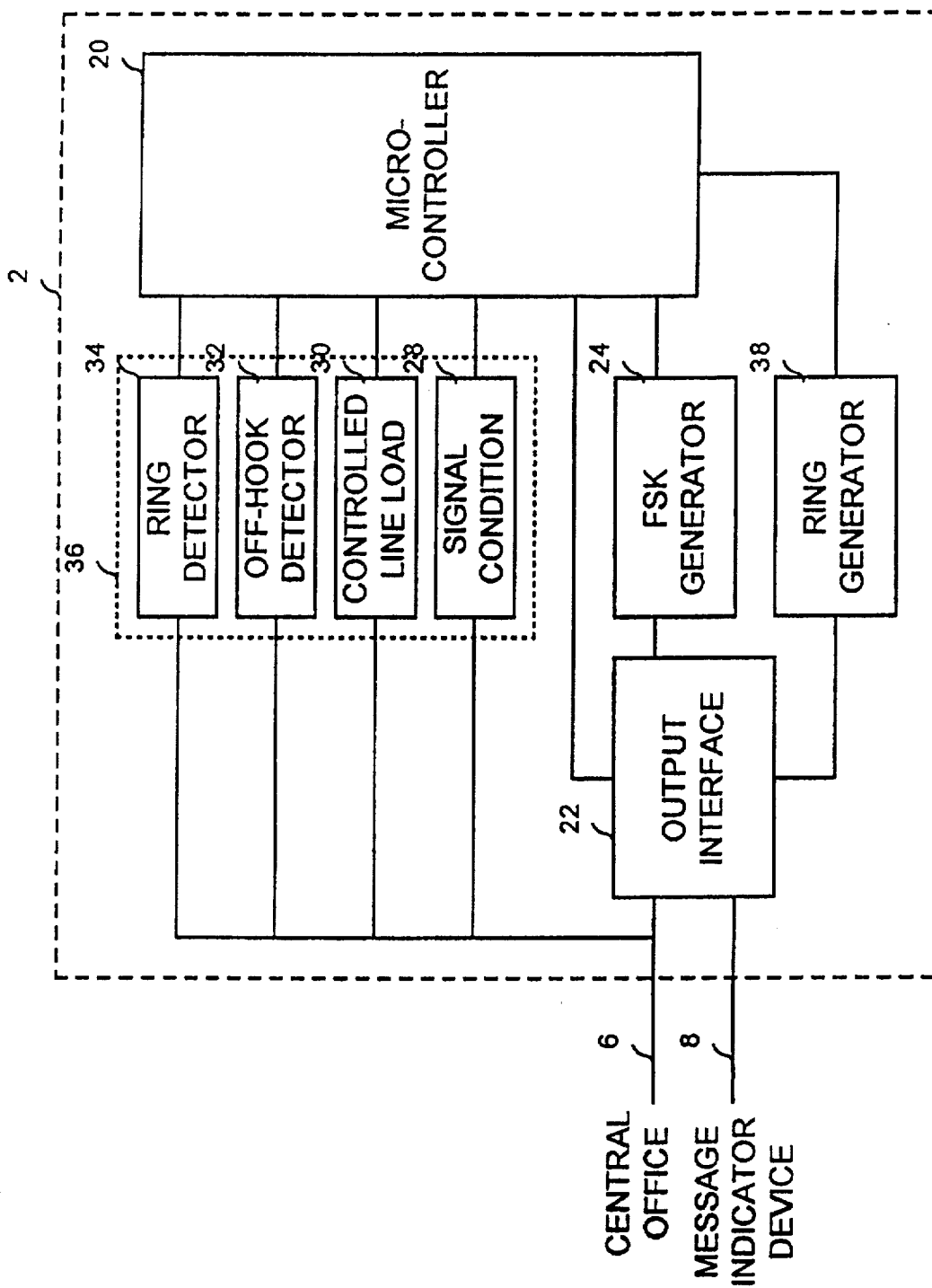
FIG. 2 is a more detailed block diagram of a dial tone converter in accordance with the first embodiment of the invention.

FIG. 2 is a block diagram which illustrates the dial tone converter in greater detail 2. The dial tone converter 2 is connected in series between a subscriber line 6 that connects with a central office and a second line 8 that connects with a message indicator device. The subscriber line 6 is connected in parallel with a ring detect circuit 34, an off-hook detect circuit 32, and a controlled line load circuit 30 which provide respective inputs to a microcontroller 20. A signal conditioning circuit 28 is also connected to convert the dial tone into an electrical signal for microcontroller 20.

Connected in series between the subscriber line 6 and the line 8 to the message indicator device is an output interface circuit 22. The output interface circuit 22 is connected directly to the microcontroller 20, indirectly to the microcontroller 20 through an FSK generator circuit 24, and through an optional ring generator circuit 38.

In this example, all operations of the dial tone converter device are controlled by the microcontroller 20, which may comprise, for example, a PIC 16C57 or other appropriate device. The microcontroller 20 contains suitable volatile and nonvolatile memory elements and controls all timing functions and the individual operations of the other circuits as described more fully below.

The ring detect circuit 34, the off-hook detect circuit 32, the controlled line load 30, and the signal conditioning circuit 28 together comprise a line interface 36 to the microcontroller 20. The ring detect circuit 34 senses a ring signal on telephone line 6 which indicates that a call is incoming. In response to the detection of a ring signal, a digital signal is generated by the ring detect circuit 34 which is provided to the microcontroller 20. This ring detect signal is required to initiate an off-hook interrupted dial tone check at some time after an unanswered incoming call in order to determine whether a message has been left.

The off-hook detect circuit 32 senses when any telephone on the subscriber line 6 is off-hook. When an off-hook condition is sensed, an OFF_HOOK digital signal is produced and provided to the microcontroller 20. This signal is utilized to initiate an off-hook interrupted dial tone check after the subscriber line 6 has been placed back on-hook.

The controlled line load circuit 30 becomes active upon command from the microcontroller 20. When placed in an active state, the controlled line load circuit draws loop DC current from the telephone line. Typically, this loop current is about 16 mA and is used to signal the telephone company's switch that a subscriber wishes to engage the line. Thus, when the microcontroller signals the line load circuit 30 to draw current from the line 6, the line will be opened and a dial tone will be supplied from the telephone exchange.

The signal conditioning circuit 28 converts the dial tone into an electrical signal according to known techniques so that the dial tone can be interpreted by the microcontroller 20. This allows the microcontroller 20 to monitor the dial tone signal and identify its characteristics, for example, whether it is a continuous tone or an interrupted dial tone.

After the microcontroller 20 has identified the dial tone characteristics, it commands the controlled line load circuit 30 to cease drawing DC loop current from the line 6, and the subscriber line 6 is thus relinquished. The microcontroller 20 then formulates or selects from memory a corresponding message to be sent to the message indicating devices connected thereto. This message is passed in a digital format to the FSK generation circuit 24 which operates under the control of the microcontroller 20. The FSK generator circuit 24 may be based on an integrated circuit, for example the Exar 2206. It modulates the signal from the microcontroller 20 into an FSK format which can be recognized, processed, and interpreted by a message indicator device connected to line 8. This format has the same meaning as the dial tone signal which was identified by the converter 2 during the off-hook check.

The microcontroller 20 sends a signal to the message indicator device via the FSK generation circuit 24, the output interface 22 will combine the FSK signal with the correct DC line voltage, impedance, and other characteristics of an on-hook telephone connection. During other times, the output interface 22 allows the device(s) which is (are) connected to the telephone line 8 to be connected directly to the central office via telephone line 6 such that all signals that normally pass therebetween can do so. For example, such normal signals may include: voice, DTMF touchtone dialling signals, Caller ID FSK signals, and dial tones. In this way, a telephone device connected to line 8 can be used in a conventional manner, for example, for voice transmission.

In addition to the above-described features, the dial tone converter device 2 includes an optional ring generator circuit 38. This circuit operates under control of the microcontroller 20 to produce a ring signal which is provided to line 8. As known in the art, this ringing signal is provided where necessary to "wake-up" certain devices which require such a signal before reading any FSK signal.

It will be understood that it is necessary to maintain the correct on-hook electrical characteristics during the FSK signalling for some message indicating devices to operate correctly. This may be accomplished in the output interface 22 by inducing the FSK signal on top of the normal on-hook line connection by means of a transformer or similar device. Alternatively, the line 8 to the message indicating devices may be disconnected from the exchange and substituting an equivalent line voltage generated from a separate source or derived from the telephone line substituted therefor. This voltage would be combined with the FSK signal to replicate the characteristics of an FSK signal being carried on an on-hook telephone line. Disconnection of the message indicating device and/or telephone extensions from the exchange during signalling may be performed by a device such as a relay.

While no specific power source is described, the dial tone converter 2 may be powered by battery, AC, or the telephone line itself. Where batteries are used, the converter 2 may feature a circuit to detect low batteries. An appropriate dc voltage source for the output interface 22 (50 VDC in the above noted example) may be derived from the telephone line, created by an internal circuit, or supplied by an external source.

With the arrangement shown in FIG. 2, the telephone line 6 is normally linked directly to line 8. When a call comes in, a telephone connected to this line will ring and any devices capable of receiving information such as Caller ID will display the name and/or number of the calling party, if such a service is subscribed to, in accordance with the normal operation and result for a subscriber. At other times, as described below, the line is disengaged and it is determined whether a message signal is being sent from the central office.

Figure 3:
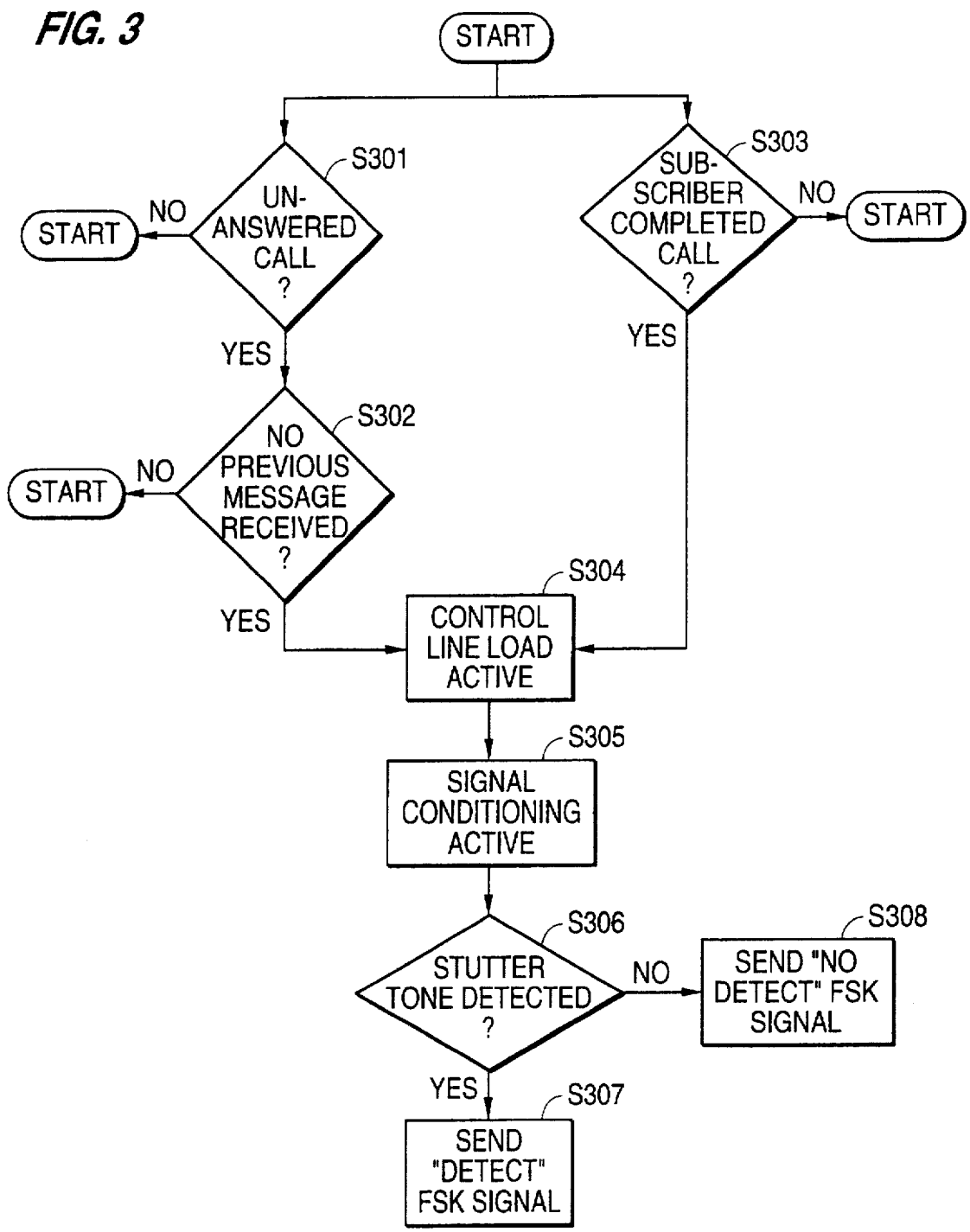
FIG. 3 is a flow chart showing an illustrative operation of a converter according to the invention.

An illustrative operation of the dial tone converter 2 is summarized in FIG. 3. It will be understood that the precise times at which the dial tone converter device of the invention can engage the telephone line and monitor the dial tone signal (hereinafter referred to as "an off-hook interrupted dial tone check") may be mandated by regulatory authorities. Changes to conform to applicable regulations falling within the scope and spirit of the invention will be apparent to the skilled artisan.

In this example, an off-hook interrupted dial tone check is made after either of two occurrences: (1) an incoming call goes unanswered; or (2) a subscriber completes a call. Typically, an off-hook interrupted dial tone check which follows an unanswered incoming call is completed within less than four minutes. An off-hook interrupted dial tone check which follows a completed subscriber call takes place between four seconds and thirty seconds after the subscriber hangs up. Preferably, the off-hook interrupted dial tone check takes the line off-hook for no more than 2.1 seconds. Moreover, it is preferable that the microcontroller be configured so as to not block a dial tone while an off-hook interrupted dial tone check is ongoing.

In FIG. 3, an unanswered call is detected at a step S301. For example, the microcontroller 20 may be programmed to determine the occurrence of an unanswered call when a logic true RING_DETECT signal from ring detect circuit 34 is received and is not followed within a predetermined time by a logic true OFF_HOOK signal from off-hook detect circuit 32. An optional intervening step S302 is also illustrated wherein it is determined whether a message waiting signal has previously been sent to a message indictor device in response to an unanswered call.

The occurrence of a completed call is determined at step S303. For example, the microcontroller 20 determines, in the absence of a true RING-DETECT signal, that the condition of the OFF-HOOK signal has changed from false to true to false.

When either an unanswered call or a subscriber call occurs, an off-hook interrupted dial tone check takes place at steps S304 to S307. At step S304, the controlled line load circuit 30 is activated so as to indicate to the central office that the subscriber line is off-hook. In response to this event, the central office produces a dial tone signal which is either regular (continuous) or an interrupted dial tone. As illustrated in step S305, the signal conditioner circuit 28 determines whether an interrupted dial tone is detected, and inputs an appropriate signal to the microcontroller 20. If an interrupted dial tone is detected at step S306, at step S307 the microcontroller 20 then sends a message to the message indicator device via the FSK generator 24 and the output interface circuit 22. If no interrupted dial tone is detected, a message is sent at Step S308 to the indicator device which indicates this occurrence.

In this first embodiment of the invention, the dial tone converter may optionally be configured so as to synchronize off-hook checks when multiple interrupted dial tone detection and visual signalling devices are attached to the same line so that only one check is made per calling event for a single line.

Figure 4:
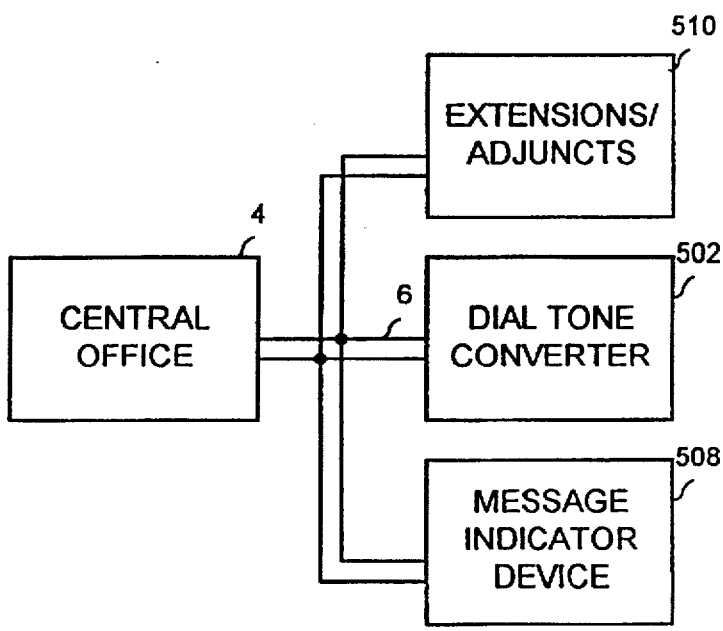
FIG. 4 is a block diagram showing a second embodiment of the invention as connected to a central exchange and to a message indicator device.

FIG. 4 is a block diagram of an alternative embodiment of the invention. In this embodiment, the second line 8 to an adjunct device shown in FIG. 1 is eliminated. Instead of one or more telephone devices or other adjuncts being linked in series to the dial tone converter 502, the dial tone converter device 502 is attached to an output jack of the subscriber line 6. With this arrangement, FSK signals are sent from the dial tone computer 502 directly back out to the subscriber line 6. Because all message indicator device(s) 508 and telephone extensions 510 are attached to the subscriber line 6 in parallel, each receives the FSK signals from the dial tone converter 502.

Figure 5:
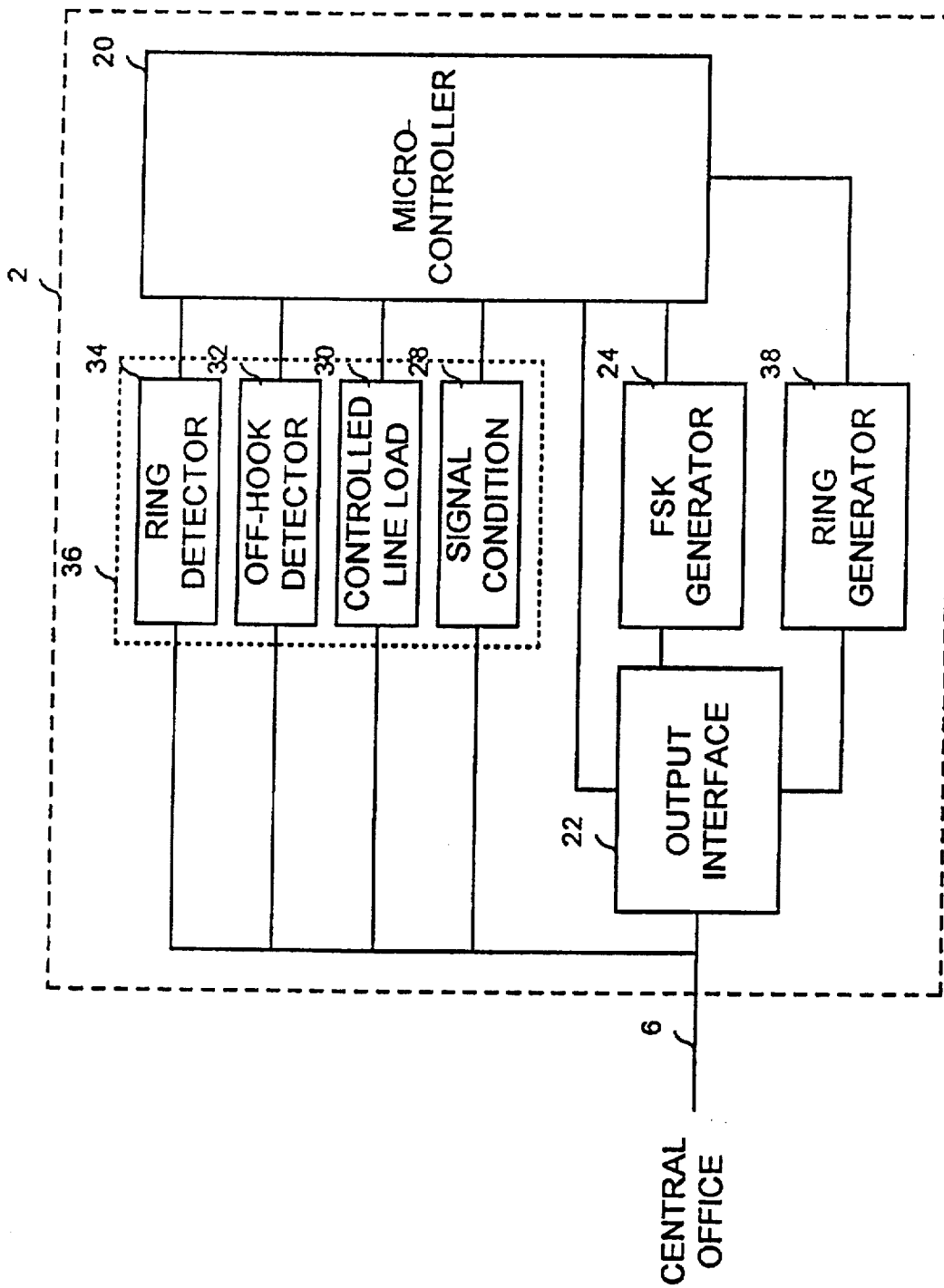
FIG. 5 is a more detailed block diagram of a converter in accordance with the second embodiment of the invention.

FIG. 5 is a more detailed block diagram of the second embodiment of the invention. It will be appreciated that the functional elements of the dial tone converter according to this embodiment are essentially similar to those of illustrated in the embodiment of FIG. 2. However, as shown in FIG. 4, the dial tone converter of this embodiment does not include a second telephone line 8 running to an adjunct device or telephone extension. Instead, the FSK signals from the FSK generator circuit are output to the subscriber line 6.

It will be appreciated that the second embodiment of the invention provides several advantages. For example, the dial tone converter device does not have to be located near the message indicator device, but can instead be connected to any telephone jack. Moreover, there is no need to require any rewiring of existing telephone or message indicating devices attached to the subscriber line. Further, only one dial tone converter is necessary to serve all telephones and message indicating devices attached to the subscriber line.

An illustrative schematic diagram for the dial tone converter device of the second embodiment is shown in FIGS. 6A to 6F. It should be understood that this schematic is merely provided as a detailed example. Many other specific implementations for the features shown more generally above will be apparent to those skilled in the art.

Figure 6A:
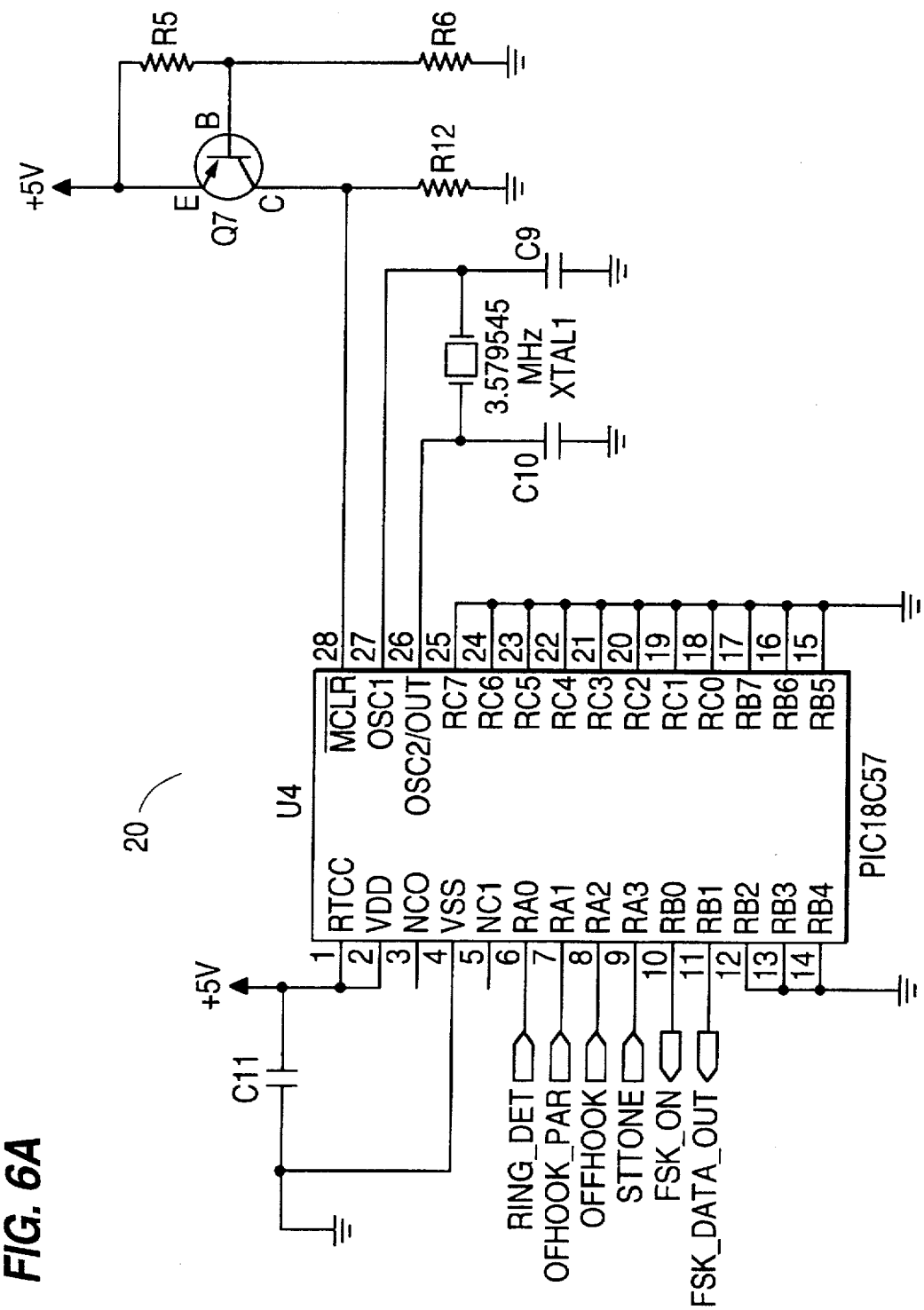
FIG. 6A to 6E are more detailed schematic diagrams of elements of a converter according to a preferred embodiment of the invention.

FIG. 6A illustrates a controller circuit 20. A microcontroller U4, for example, a PIC controller, part number PIC16C57-X manufactured by Microchip, receives a 5.579545 MHz clock signal from a crystal XTAL1. Associated circuitry, including capacitors C9, C10 and C11, resistors R5, R6, and R11, and transistor Q7 provide further inputs to the microcontroller U4. The microcontroller U4 receives and transmits the following signals to control the other elements of the circuit: RING-DET, OFFHOOK_PAR, OFFHOOK, STTONE, FSK_DAT_OUT.

Figure 6B:
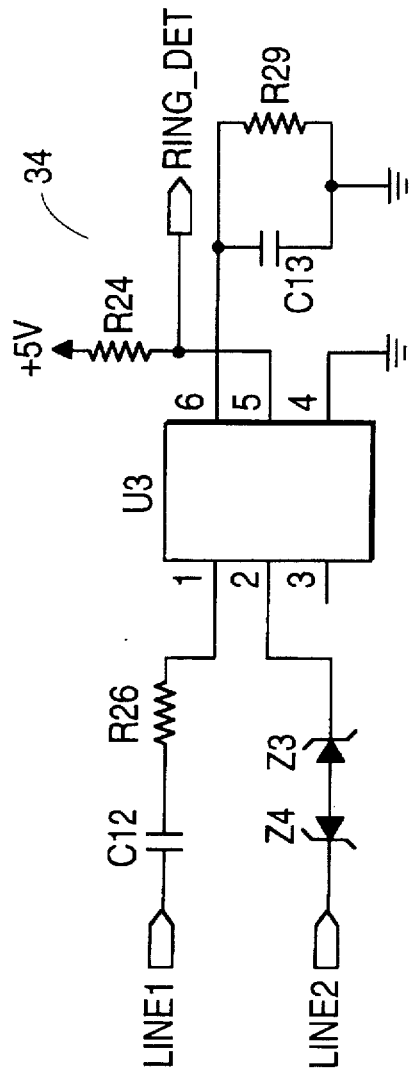

FIG. 6B illustrates circuitry which, in conjunction with the other elements shown, provides for ring detection. The signal path from the subscriber line (designated LINE1 and LINE2) are received through capacitor C12 and resistor R26 and zener diodes Z3 and Z4 by an optocoupler U3. Resistors R24 and R29, and capacitor C13 are arranged as shown such that a signal RING_DET is produced when a threshold voltage is detected on the subscriber line which indicates a ring signal. The RING_DET is input to the microcontroller U4 as shown in FIG. 6A.

Figure 6C:
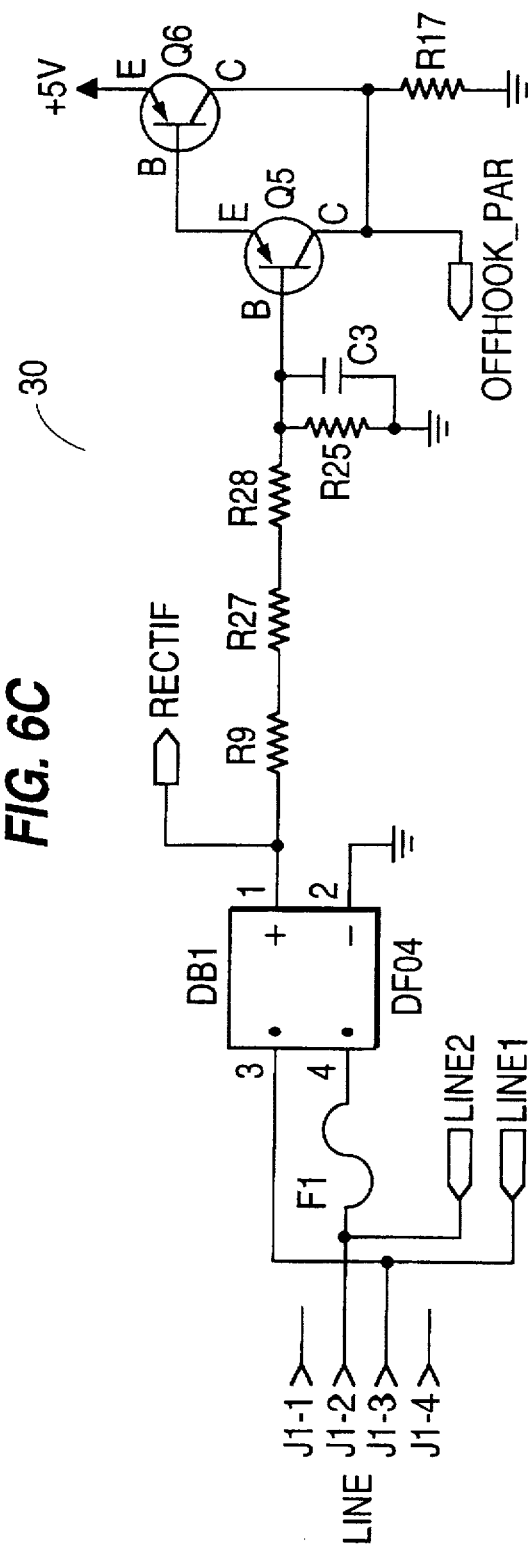

FIG. 6C illustrates circuitry 32 which, in conjunction with the other elements shown, detects whether the subscriber line is off-hook. As shown, the signal line leads via polyswitch F1 to a diode bridge rectifier DB1. A signal RECTIF is taken from an output of the diode bridge rectifier DB1. The same output is connected via series resistors R9, R27, and R28, and RC network R25 and C3 to transistors Q5 and Q6. The collector of transistor Q5 provides a signal OFFHOOK_PAR to the microcontroller when a DC voltage is present on the subscriber line which corresponds to an off-hook condition.

Figure 6D:
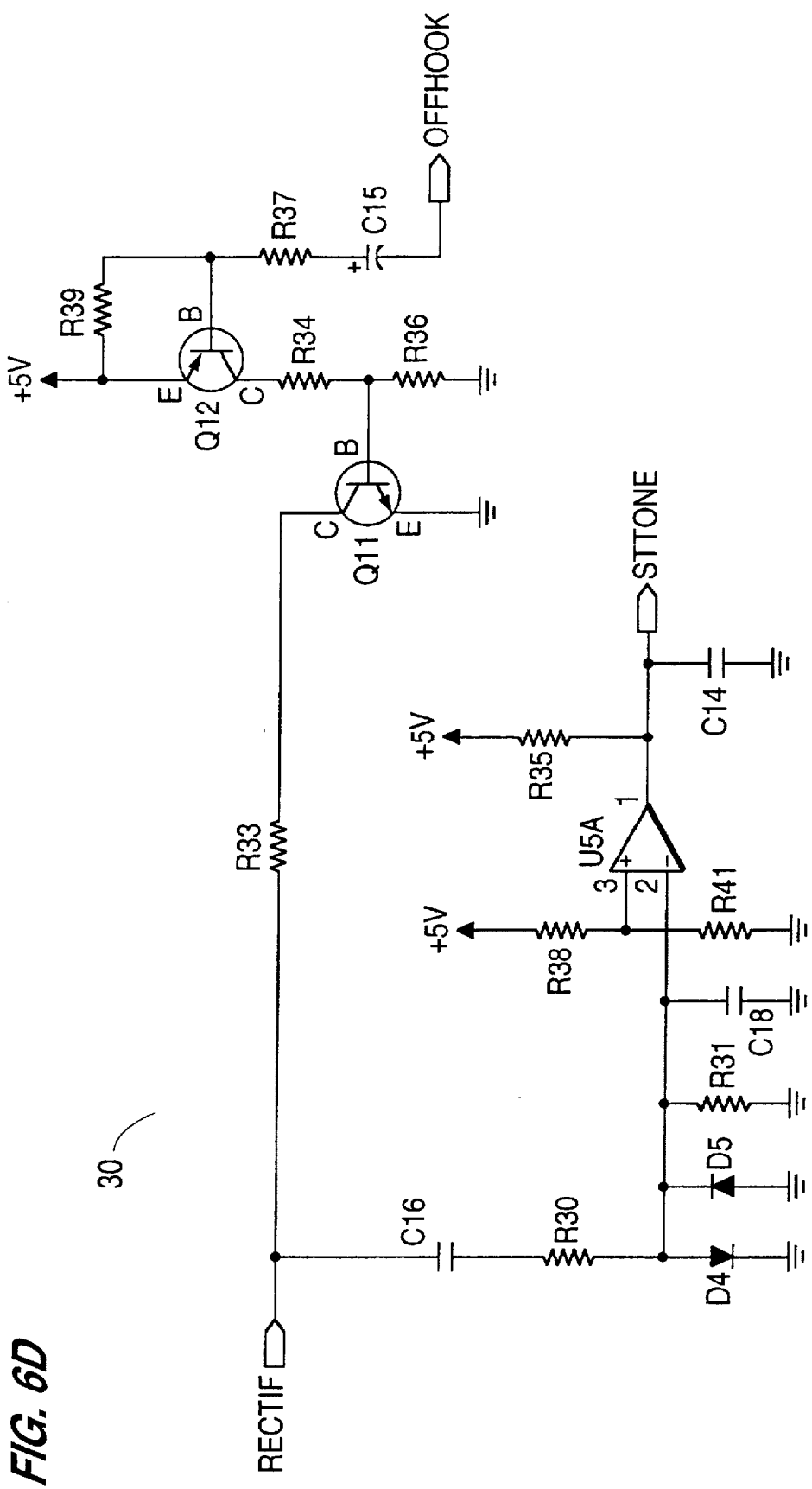

FIG. 6D illustrates circuitry which, in conjunction with the other elements shown, provides the controlled line load functionality 30 described more generally above. As shown, the RECTIF signal (see FIG. 6C) is connected via resistor R33 to the collector of a transistor D11. The base of transistor D11 is connected between series resistors R34 and R36 to the collector of transistor Q12. A signal OFFHOOK is obtained from the base of transistor Q12 via transistor R37 and capacitor C15 and is provided to the microcontroller U4.

The RECTIF signal is input to one input of a comparator U5A via the arrangement comprising capacitors C16 and C18, resistors R30 and R31 and diodes D4 and D5. This input is compared with a voltage determined by the voltage produced by the divider network comprising biased resistors R38 and R41. The output of the comparator indicates the presences of an interrupted dial tone and is output via resistors R35 and C14 as signal STTONE to the microcontroller 20.

Figure 6E:
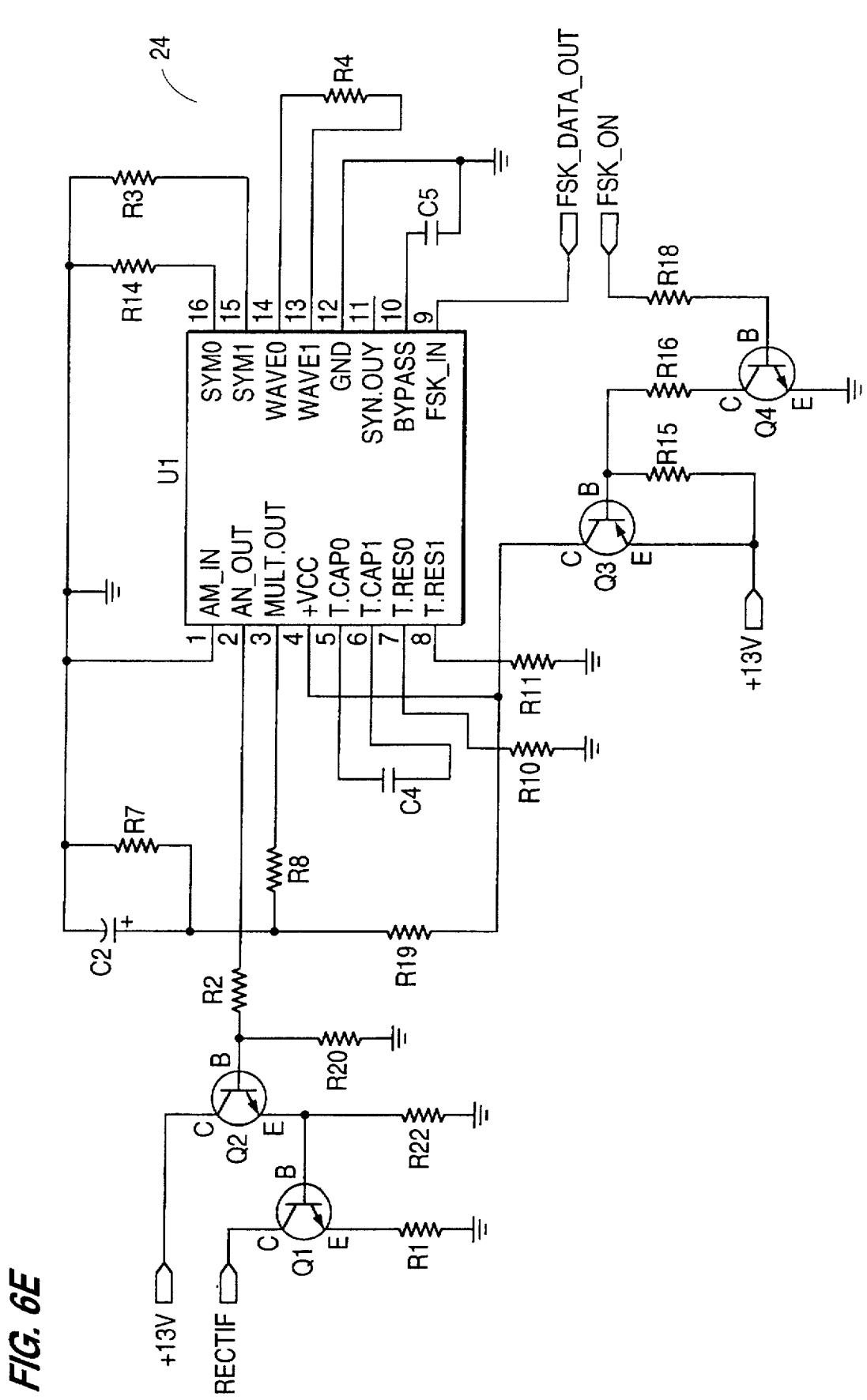

FIG. 6E illustrates circuitry 24 which, in conjunction with the other elements shown, provides the FSK generation functionality described more generally above. This circuitry principally includes a function generator SMT integrated circuit U1, in this example, part no. XR2206D by Exar. Arranged in conjunction with component U1 are resistors R1, R3, R7, R8, R10, R11, R14, R15, R16, R18, R19, capacitors C2, C4, C5, and transistors Q1 to Q4. When activated by signal FSK_ON, The function generator U1 produces a properly conditioned signal at output AN-OUT based on the FSK_DATA_IN signal received from the microcontroller. This output is utilized to produce a message that is understood by message indicator devices configured to receive messages in an FSK format.

Preferred examples of the invention have now been described in fulfillment of the above objects. It should be appreciated that these examples are merely illustrative of the invention. Many variations and modifications will be apparent to those skilled in the art.

For example, while the invention may be embodied in a unitary dial tone converter device that is connected to a separate telephone device (in parallel or in series), it may also be embodied in an integrated telephone device that combines the features of the invention those of other devices. More particularly, an apparatus in accordance with the invention may be combined within a single housing with a telephone device or a message indicator device. Thus, the invention is not limited to a unitary converter device, but could may also be embodied in an integrated device that includes the same features as a standard telephone and/or message indicator device.

Further, the modulated signal output from the FSK generator may be in an FSK format or another format, depending upon the intended message indicator devices and/or telephones connected thereto. Moreover, the dial tones that the converter can identify and convert may include not only continuous and interrupted dial tones, but also dial tones of different frequencies, patterns of intermittency, or other characteristics. Further, the device may identify call progress tones other than dial tones.

Other variations will also be apparent to the skilled artisan.

What is claimed is:

1. A method for converting a message received from a central office in a first format into a second format that is compatible with a message indicator device configured to convey the message to a user, the method comprising the steps of:

monitoring a subscriber line to determine the occurrence of one or more predetermined conditions;

upon detection of the one or more predetermined conditions, placing the subscriber line in an off-hook condition to detect the message from the central office in the first format;

converting the message from the first format to a converted message in the second format; and providing the converted message to at least one message indicator device;

wherein the first format is an interrupted dial tone and the second format is a frequency shift keyed format.

2. The method according to claim 1, wherein the one or more predetermined conditions includes an unanswered call.

3. The method according to claim 1, wherein the one or more predetermined conditions includes a completion of a call.

4. The method according to claim 1, wherein the step of providing includes providing the converted message to the subscriber line whereby the converted message is made available to any message indicator devices connected in parallel along the subscriber line.

5. The method according to claim 1, wherein the converted message is provided directly to a message indicator device through a second line.

6. The method according to claim 1, wherein the at least one message indicator device is alerted with a ring signal prior to receiving the converted message.

7. The method according to claim 1, wherein the message indicates that a voice message is available for retrieval by the user.

8. The method according to claim 1, wherein the step of placing the subscriber line in an off-hook condition to detect the message in the first format occurs at specific intervals when the subscriber line is not in use by any message indicator devices or telephone devices connected thereto.

9. The method according to claim 1, wherein a telephone device is connected to the subscriber line, and said step of monitoring occurs when the telephone device is on-hook.

10. An apparatus for converting a message received from a central office in a first format to a second format, comprising:

means for monitoring the subscriber line to determine the occurrence of one or more predetermined conditions;

means for placing the subscriber line in an off-hook condition to detect the message in the first format upon detection of the one or more predetermined conditions;

means for converting the message from the first format to a converted message in the second format; and means for providing the converted message to at least one message indicator device configured to convey to a user messages received in the second format;

wherein the first format is an interrupted dial tone and the second format is a frequency shift keyed format.

11. The apparatus according to claim 10, wherein the one or more predetermined conditions includes an unanswered call.

12. The apparatus according to claim 10, wherein the one or more predetermined conditions includes a completion of a call.

13. The apparatus according to claim 10, wherein the apparatus is connected in parallel along the subscriber line with the at least one message indicator device, the at least one message indicator device receiving the converted message through the subscriber line.

14. The apparatus according to claim 10, wherein the apparatus is connected in series between the subscriber line and the at least one message indicator device.

15. The apparatus according to claim 10, further comprising means for alerting the at least one message indicator device with a ring signal prior to providing the converted message to the at least one message indicator device.

16. The apparatus according to claim 10, wherein the message indicates that a voice message is available for retrieval by the user.

17. The apparatus according to claim 10, wherein the subscriber line is placed in an off-hook condition to detect the message in the first format at specific intervals when the subscriber line is not in use by any message indicator devices or telephone devices connected thereto.

18. The apparatus according to claim 10, wherein a telephone device is connected to the subscriber line, and the means for monitoring is operational when the telephone device is on-hook.

* * * * *